(12) United States Patent
Schönenberg

(10) Patent No.: US 12,275,592 B2
(45) Date of Patent: Apr. 15, 2025

(54) CONTAINER FEED SYSTEM FOR THE TRANSPORT OF CONTAINERS

(71) Applicant: FERRUM PACKAGING AG, Schafisheim (CH)

(72) Inventor: Simon Schönenberg, Barmstedt (CH)

(73) Assignee: FERRUM PACKAGING AG, Schafisheim (CH)

( * ) Notice: Subject to any disclaimer, the term of this patent is extended or adjusted under 35 U.S.C. 154(b) by 167 days.

(21) Appl. No.: 18/218,529

(22) Filed: Jul. 5, 2023

(65) Prior Publication Data

US 2024/0025651 A1    Jan. 25, 2024

(30) Foreign Application Priority Data

Jul. 19, 2022   (EP) .................................... 22185616

(51) Int. Cl.
  *B65G 17/12*    (2006.01)
  *B65G 19/02*    (2006.01)
  (Continued)

(52) U.S. Cl.
  CPC ............. *B65G 17/12* (2013.01); *B65G 19/02* (2013.01); *B65G 19/205* (2013.01);
  (Continued)

(58) Field of Classification Search
  CPC .................. B65G 17/12; B65G 19/225; B65G 2201/0235; B65G 19/205; B65G 19/245; B65G 19/02; B65G 47/84; B65B 43/50
  (Continued)

(56) References Cited

U.S. PATENT DOCUMENTS 2,345,870 A * 4/1944 Guenther ........... B21D 51/2692
                                                    198/474.1
3,717,236 A * 2/1973 New .................... B65G 47/846
                                                    198/470.1
(Continued)

FOREIGN PATENT DOCUMENTS

DE         2413661      10/1974
EP         2550119 B1   1/2013
              (Continued)

OTHER PUBLICATIONS

European Search Report issued Jan. 30, 2023 in corresponding European Application No. 2218516.4.

*Primary Examiner* — Mark A Deuble
(74) *Attorney, Agent, or Firm* — Global IP Counselors, LLP

(57) ABSTRACT

A container feed system for the transport of containers along a transport path includes a pulling element, first carriers, second carriers, the first and second carriers arranged distributed at fastening points of the pulling element such that the containers are received and transported along the transport path by the first and second carriers during movement of the pulling element. The fastening points for first and second carriers of the first carriers are arranged side by side on the pulling element and have a first fastening distance and the fastening points of a third carrier of the first carriers is arranged next to a first carrier of the second carriers on the pulling element and have a second fastening distance. The second carriers have a shape that is different the first carriers such that a transport distance between the containers guided side by side along the transport path is constant.

18 Claims, 4 Drawing Sheets

(51) Int. Cl.
*B65G 19/20* (2006.01)
*B65G 19/22* (2006.01)
*B65G 19/24* (2006.01)
*B65G 47/84* (2006.01)

(52) U.S. Cl.
CPC ......... *B65G 19/225* (2013.01); *B65G 19/245* (2013.01); *B65G 47/84* (2013.01); *B65G 2201/0235* (2013.01)

(58) Field of Classification Search
USPC ........................................ 198/728, 731, 733
See application file for complete search history.

(56) References Cited

U.S. PATENT DOCUMENTS

| | | | | |
|---|---|---|---|---|
| 4,709,800 A * | 12/1987 | Olsen | ........................ | B65C 9/02 198/836.3 |
| 4,915,950 A * | 4/1990 | Miranda | ............... | A61K 9/7084 424/447 |
| 4,998,399 A * | 3/1991 | Lutzke | ................. | B65G 47/084 53/448 |
| 5,161,664 A * | 11/1992 | LeBras | ................. | B65G 47/082 198/465.2 |
| 5,201,823 A * | 4/1993 | Pazdernik | .............. | B65G 47/29 198/419.3 |
| 5,901,833 A * | 5/1999 | Yokoyama | ........... | A63B 47/025 473/166 |
| 6,490,979 B1 * | 12/2002 | Pfleger | ................... | B65G 19/02 104/162 |
| 7,958,989 B2 * | 6/2011 | Bonnain | .............. | B65G 19/245 198/465.1 |
| 9,056,722 B2 | 6/2015 | Otto | | |
| 9,694,980 B1 | 7/2017 | Leslie | | |
| 2015/0239669 A1 | 8/2015 | Miller et al. | | |
| 2023/0264906 A1 * | 8/2023 | Johnsson | .............. | B65H 1/025 198/717 |
| 2025/0026625 A1 * | 1/2025 | Gasser | ................. | B65G 19/185 |

FOREIGN PATENT DOCUMENTS

| | | |
|---|---|---|
| EP | 2818434 B1 | 6/2013 |
| GB | 1416653 A | 12/1975 |
| JP | 5730210 U | 2/1982 |
| JP | 769439 A | 3/1995 |

\* cited by examiner

CONTAINER FEED SYSTEM FOR THE TRANSPORT OF CONTAINERS

CROSS-REFERENCE TO RELATED APPLICATION

This application claims priority to European Patent Application No. 22135616.4, filed Jul. 19, 2022, the contents of which are hereby incorporated by reference in its entirely.

BACKGROUND

Technical Field

The disclosure relates to a container feed system for the transport of a container, a processing device for processing the container and a method for the transport of containers according to the preamble of the independent claims.

Background Information

A conventional generic container feed system for the transport of a container to container receiver is disclosed in DE 4236784 A1.

In the food industry, it is usual to use a production line for such a transport. In this process, a container is delivered from a container supply system to a container feed system. This system then feeds the container to a container processing device. The foodstuff in question is filled into the container and/or the container is sealed with a lid by this container processing device.

Especially in the beverage industry, the common practice is to convey beverage cans after the filling process into a sealing module (also container sealer) of a can sealer by a container feed system in form of a so-called infeed table. This infeed table consists of a sliding belt on which the cans are arranged upright and are transported by chain carriers. To prevent a lateral breakaway of the can flow, side guide rails limit a lateral movement of the cans.

In the sealing module, the still open cans reach the so-called seaming station in the sealing module, where they are applied with a lid and at the same time the headspace of the container is gassed with a protective gas or an inert gas to ensure the shelf life of the product. Subsequently, the container on the seaming station is set in rotation, while the seaming station simultaneously rotates about the central axis of the sealing module. Since in practice usually several seaming stations are used on a carrousel-like middle part of the sealing module, higher sealing rates are possible.

For example, conventional can scalers are known from DE 749636 and DE 4234115 A1. Can sealers comprise a clamping device for receiving a can to be sealed. In the operating state, the can to be sealed is introduced into the clamping device and secured by it in axial and radial direction. A can lid is also introduced centered over the can opening of the can body to be sealed. The can body has a circumferential can flange in the area of the can opening and the can lid has a circumferential can lid flange. For sealing the can opening by the can lid, the can sealer additionally comprises two seaming rolls, each mounted rotatably about an axis, which press the can flange and the can lid flange together by a force acting substantially radially, the pressing being effected by a continuous rolling in the circumferential direction along the circumference of the can opening.

For a better understanding of the present disclosure, a container feed system known from the state of the art in the form of an infeed table according to DE 42 36 784 A1 is first described in the following on the basis of FIG. 1. The infeed table briefly described above could, for example, be designed substantially as follows.

For a better distinction of the known state of the art from the subject matter of the present disclosure, reference signs to features of known devices are provided with an inverted comma (in FIGS. 1 and 5) in the context of this application, whereas features to devices according to the disclosure or their components do not carry an inverted comma.

In the known transport module 3' according to FIG. 1, a container 1' previously filled with contents in a filling device not shown, in the present example a metallic can for receiving a beverage or for receiving another foodstuff or any other product, is pushed on a rail 5' of the transport module 3' in direction A' by a finger 4a' attached to a drive chain 4'. The can 1' is guided on its opposite sides by a guide rail 6' and a chain-side guide 13'. Then, the can 1' is transferred to a can lifter 12' of a sealing module 10', which moves synchronously with the transport module 3', and enters a recess 7a' of a sealing rotary head 7', which rotates in the circumferential direction U1'. When entering the sealing rotary head 7', a recess 8a', 15' of an opposite rotary head 8' or of a counter rotary head 8', which is preferably arranged at a position symmetrical to the sealing rotary head 7' and which rotates synchronized with the sealing rotary head 7' in the reverse direction of rotation U2' and the recess 7a' of the sealing rotary head 7' hold the can 1' in position on a line F'-F' from opposite sides and center the can 1' in a position suitable for sealing or crimping. After a container lid 2' has been crimped to the container 1' by a sealing or crimping roll not shown, the container 1' sealed with the container lid 2' moves via an ejector rotary head 9' and an ejector rail 14' in the direction B' via, a can ejector conveyor 9' and is then fed to the next step in the sequence or process.

The transport of the containers to the container receiver is thus usually performed by sliding the container on a transport rail from the container supply system to the container receiver (i.e., along a transport path), wherein the container is guided by a carrier, a finger, for example. This finger is connected to a chain (so-called chain carrier), which is arranged along the transport rail. The chain is preferably circumferential and attached to deflection rolls or other components which allow that the chain can be moved by a drive. The chain is a rolling chain, which is guided over a rolling surface.

SUMMARY

It has been discovered that these devices, known from the state of the art, have some disadvantages.

The chain drive, which is required for the transport of the container produces abrasion (on the chain and the rolling surface) which, just like the lubricant required for the chain, can get into the containers, and can thus lead to contamination. In addition, the cleaning of the chain causes problems, as there are dead spaces between the individual links, which provide room for contamination and can be colonized by microorganisms. As with all filling processes, there is also a risk of spillage of filling material when filling foodstuff. However, since any spillage of foodstuff entails accelerated growth of microorganisms, a regular cleaning is necessary. The cleaning of the chain is by its very nature synonymous with plant downtime, which is to be avoided for cost reasons.

In addition, a specific chain spacing, for example 92 mm, has also become established over the years to ensure a clean transition of the cans to the lifting stations. This spacing has a small range in which it can deviate. Here, the spacing must be larger than the spacing of the previous system (normally a filler) and smaller than the spacing of the following system (normally a sealer). This is substantial to ensure that the transfer from one system to the next works properly. According to the current state of the art, one therefore has to rely on common chain spacings as well as on specially manufactured chains with an appropriate spacing. This fact complicates the realization of alternative pulling elements, which have other spacings. Due to this fact, the transport distance, i.e., the distance between the individual containers, cannot be kept constant and thus a clean transfer of the cans to the lifting station is not guaranteed. Therefore, systems equipped with the state of the art are inflexible with regard to the choice of the pulling element.

Starting from the known art, it is the object of the disclosure to provide a container feed system, a processing device, and a method for the transport of containers, which avoid the adverse effects known from the state of the art. Especially, a container feed system should be flexibly adaptable to and usable with the different sealing modules in use, so that all sealing modules can be optimally supplied with containers to be sealed.

This object is met by a container feed system according to the disclosure, a processing device according to the disclosure and the method according to the disclosure.

According to the disclosure, a container feed system for the transport of containers (in particular of cans) along a transport path is proposed. The transport path is located preferably between the container source and the container receiver and corresponds to the distance covered by the container.

The container feed system comprises a pulling element, which can be moved along the transport path and a first plurality of carriers. In addition, the container feed system further comprises a second plurality of carriers different from the first plurality, wherein the first plurality of carriers and the second plurality of carriers are arranged at fastening points of the pulling element.

In the arrangement of the carriers on the pulling element, the fastening points of two carriers of the first plurality arranged side by side on the pulling element form a first fastening distance and the fastening points of one carrier of the first plurality and one carrier of the second plurality arranged on the pulling element next to the carrier of the first plurality form a second fastening distance. Here, the carriers of the second plurality have a shape differing from the carriers of the first plurality in such a way that the distance between containers that can be guided side by side along the transport path remains constant irrespective of the first fastening distance and the second fastening distance of the carriers. In this case, in particular the distance (also transport distance) between containers that can be guided/transported (directly) side by side along the transport path is constant for different first fastening distance and second fastening distance.

The different pluralities of carriers are distributed on the pulling element in such a way that the containers can be received and transported along the transport path by the first plurality of carriers and the second plurality of carriers during the movement of the pulling element.

By using alternative pulling elements, the costs can be reduced and downtimes due to cleaning work can be reduced or avoided. Furthermore, the hygiene standards can be increased due to the simplified cleaning of a pulling element that is alternative to the chain. The use of alternative pulling elements is made possible in particular since different (shaped) carriers are used instead of a plurality of identical carriers.

In this case, the pulling element can be a rope, a belt or a strap, particularly preferably a toothed belt. In the context of the disclosure, a "toothed belt" can be understood as a drive belt with toothing, which runs in a form-locking manner in toothed pulleys. A toothed belt combines the technical properties of a chain and a flat belt. On the inside of a toothed belt there are teeth, which comprise an elastomer in particular. Due to these teeth follows a certain spacing of the toothed belt, wherein this is defined by the distance between the teeth. The carriers can be arranged in spaces between the teeth, i.e., there is their fastening point. The fastening points are thus located between the teeth of the toothed belt. However, one tooth is preferably milled off for attaching the carriers. Subsequently, the toothed belt is punched. Then, a replacement tooth is then inserted through the punched hole, to which the carrier is fastened.

The carriers can be screwed, clamped, or riveted to the pulling element. These are only some exemplary fastening possibilities and in no way exclude other types of fastening.

The different shape of the carriers results in particular from a constant transport distance of the containers with non-constant fastening distances of the individual carriers on the pulling element. Here, the transport distance is defined as the distance between adjacent containers, more precisely the distance between the individual contact points or also touch points of a container to be transported with a carrier. The shape of the carriers differs substantially in the vertical displacement of the contact point with respect to a reference axis which is perpendicular to the pulling element (in a two-dimensional view) and passes through the fastening point of the carrier to the pulling element. Due to this vertical displacement, the distance between the fastening point and the contact point also changes, which can vary for each individual carrier. Due to the displacement of the contact point in the direction of the container source, here the direction of movement of the carriers, the transport distance can be decreased if it has increased due to the non-constant spacing. In contrast, a vertical displacement of the contact point against the direction of movement of the containers can lead to an increase in the transport distance. With these differently shaped carriers, i.e., the vertical displacement of the contact point as a result of the different shape, deviations from the required transport distance can be compensated or corrected.

Thus, the disclosure enables in particular an increase in flexibility with respect to the pulling means, since now the distance of the guided containers is kept constant, due to the different shape of the carriers, thus eliminating the rough limitation imposed by the available spacings. This guarantees a dean transfer of the cans to the lifting stations. Furthermore, other pulling elements can now be used that do not meet the requirement for the specific chain spacing. Thus, this distinctive feature eliminates the disadvantages of the state of the art DE 4236784 A1, where, in contrast to the disclosure, the transport distance remains constant due to the spacing on the chain, which has been evaluated over the years, and not due to the pluralities of differently shaped carriers.

Particularly preferred, the first plurality of carriers can comprise a plurality of different types of carriers, wherein the different types of carriers have a shape differing from each other. Here, the distance between the containers guided side by side along the transport path differs from the first fastening distance of each type of carrier.

The shape of the different types of carriers can differ by a distance of the contact point of the carriers with the container to the fastening point along a moving direction of the pulling element. The shape of the first and second plurality of carriers can also differ by a distance of the contact point of the carriers with the container to the fastening point along a moving direction of the pulling element. This also means, in particular, that a direct distance between contact point and fastening point differs for the first and second plurality of carriers and the different types of carriers.

In an embodiment of the disclosure, the first fastening distance can differ from the second fastening distance such that in particular the first fastening distance is smaller than the second fastening distance.

According to a further embodiment, at least one carrier of the second plurality of carriers can be arranged directly next to a carrier of the first plurality of carriers and at least one carrier of the first plurality can be arranged directly next to another carrier of the first plurality. In this case, "directly next to" means in particular directly next to each other, i.e., that there is no other carrier in between.

The container feed system according to the disclosure can comprise carriers which are curved in such a way that the containers are stabilized by the carrier during a movement along the transport path. In particular, the plurality of carriers can be designed as fingers.

In a preferred embodiment, the container feed system according to the disclosure can comprise a guide along the transport path. The carriers are arranged on the guide in such a way that the carriers can be moved in a sliding manner along a first surface of the guide by the pulling element and are guided by the guide along the transport path in this way. Thus, the carriers are arranged on the guide in a sliding manner and in this way prevent that shocks occurring in the operating state are transmitted to the containers.

Particularly preferred, the carrier can comprise a sliding element having at least a first sliding surface. Here, the sliding surface is arranged on the first surface such that the carrier can be moved via the sliding element in a sliding manner along the first surface of the guide.

In a preferred embodiment of the disclosure, the first sliding surface can be a first bearing surface that rests on the first surface (i.e., is supported on the guide) in such a way that the carrier can be moved via the bearing surface in a sliding manner along the first surface of the guide. Due to the fact that the bearing surface rests on the guide, the carrier supports its weight on the guide. This enables a very large selection of pulling elements, since the weight of the carriers does not have to be carried by the pulling element. In the operating state, the carriers are guided in particular in a horizontal plane. In this way, the containers can also be transported horizontally (preferably sliding over a surface).

In combination with the embodiment with the first bearing surface, the pulling element (at least along the transport path or the guide) can be arranged in such a way that it can be moved in a free-floating manner. I.e., in contrast to the state of the art with the roller chain, which is guided over a rolling surface, the pulling element (at least along the transport path or the guide) has no contact with a base or a supporting surface but is guided "in the air" without contact. In this embodiment, the pulling element is connected to the carrier and thus supported on the guide via the carrier.

Furthermore, the sliding element can comprise a second sliding surface and the second sliding surface can be arranged on the bearing surface, in particular substantially perpendicular to the bearing surface, in such a way that the second sliding surface can be moved in a sliding manner along a second surface of the guide. In addition, the sliding element can comprise a third sliding surface and the third sliding surface can be arranged on the hearing surface, in particular substantially perpendicular to the bearing surface and spaced from the second sliding surface, in such a way that the third sliding surface can be moved in a sliding manner along a third surface of the guide. In practice, it is particularly preferred if the sliding element has a shape corresponding to the guide. Thus, the sliding element can have a recess which corresponds to the shape of the guide in such a way that the recess can be (or is) arranged on the guide and the sliding surfaces which surround the recess are arranged on the guide. For example, the guide can have a rectangular cross-section and the sliding element can have a recess with a rectangular cross-section. The second and third sliding surface can be side surfaces that laterally limit the movement of the sliding element on the guide.

In addition, the carrier can be arranged on the guide in such a way that the carrier can only be moved along the guide in a sliding manner, i.e., between carrier and guide (or between sliding element and guide) there is only a sliding contact that the contacting surfaces of the carrier/sliding element and the guide slide on each other. Thus, there is no further contact, e.g., by a rolling element. This is advantageous, since further elements lead to a complicated device with more dead spaces.

The sliding element can be an element separate from the carrier and attached to the carrier (for example by a screw connection), which is arranged between the carrier and the guide. As an alternative, the sliding element and the carrier can be made from one piece, so that the sliding element is an integral element of the carrier.

The disclosure further relates to a processing device for processing a container, comprising a container source, a container receiver, and the container feed system according to the disclosure. The container can be transported from the container source to the container receiver by the container feed system.

In practice, the container source can be, for example, a container dispenser known per se from the state of the art for providing empty containers and/or the container receiver can be designed in the form of a filling station for filling the container with a filling material. Of course, the container source can also be designed in the form of a filling station for filling the container with a filling material and/or the container receiver is realized in the form of a sealing module for sealing the container by a lid.

In particular, the filling station can function in parallel as a container receiver and a container dispenser. The empty containers are fed to the filling station from a corresponding container dispenser, in certain cases possibly by the container feed system according to the disclosure, then the containers are filled with a filling material in the filling station, wherein the filled container is then transferred to a further container feed system according to the disclosure of the processing device, which finally conveys the filled container to a sealing module and transfers the container to the latter for sealing. It is understood that in all embodiments, the transport path can comprise at least one straight section and at least one curved section. For the embodiments comprising a guide, it is understood that the guide can also comprise at least one straight section and at least one non-straight section.

Finally, the disclosure also relates to a method for the transport of a container from a container source to a container receiver by a container feed system according to the disclosure, in particular a method for the transport of a container by using a processing device according to the disclosure, wherein the container feed system is arranged between a receiving area and a transfer area between the container source and the container receiver. In the process, the container is received in the receiving area and transported to the transfer area by the carrier provided on the container feed system, which carrier is moved in particular exclusively in a sliding manner along the first surface. The container receiver comprises a sealing module which comprises a filling device and can thus first fill the container, gas it with a protective gas and finally seal it. According to the disclosure, this sealing can be carried out by a lid.

In the context of the disclosure, a container feed system according to the disclosure or a processing device or a method for the transport of containers according to the present disclosure is particularly advantageously used in the food industry, wherein beverage cans or food cans are preferably used as containers and the individual beverage can or food can is filled with a foodstuff.

In practice, known can sealers/sealers or fillers can be modified with the container feed system according to the disclosure, in order to avoid the disadvantages of the state of the art in this way.

BRIEF DESCRIPTION OF THE DRAWINGS

In the following, the disclosure and the state of the art are explained in more detail based on embodiments with reference to the drawings.

DETAILED DESCRIPTION

Figure 1:
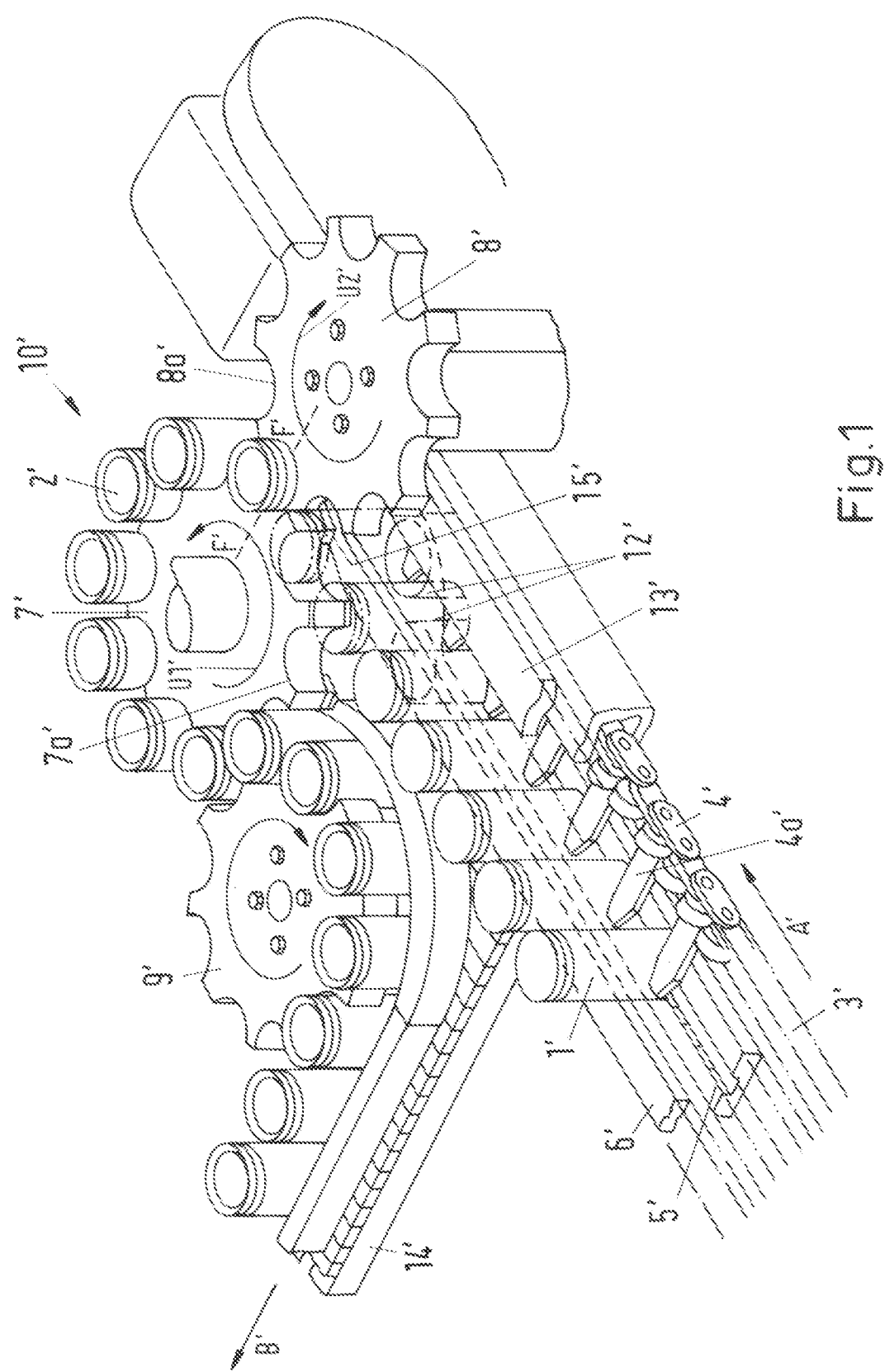
FIG. 1 illustrates a feed system known from the state of the art.

FIG. 1 has already been explained above with reference to the state of the art.

Figure 2:
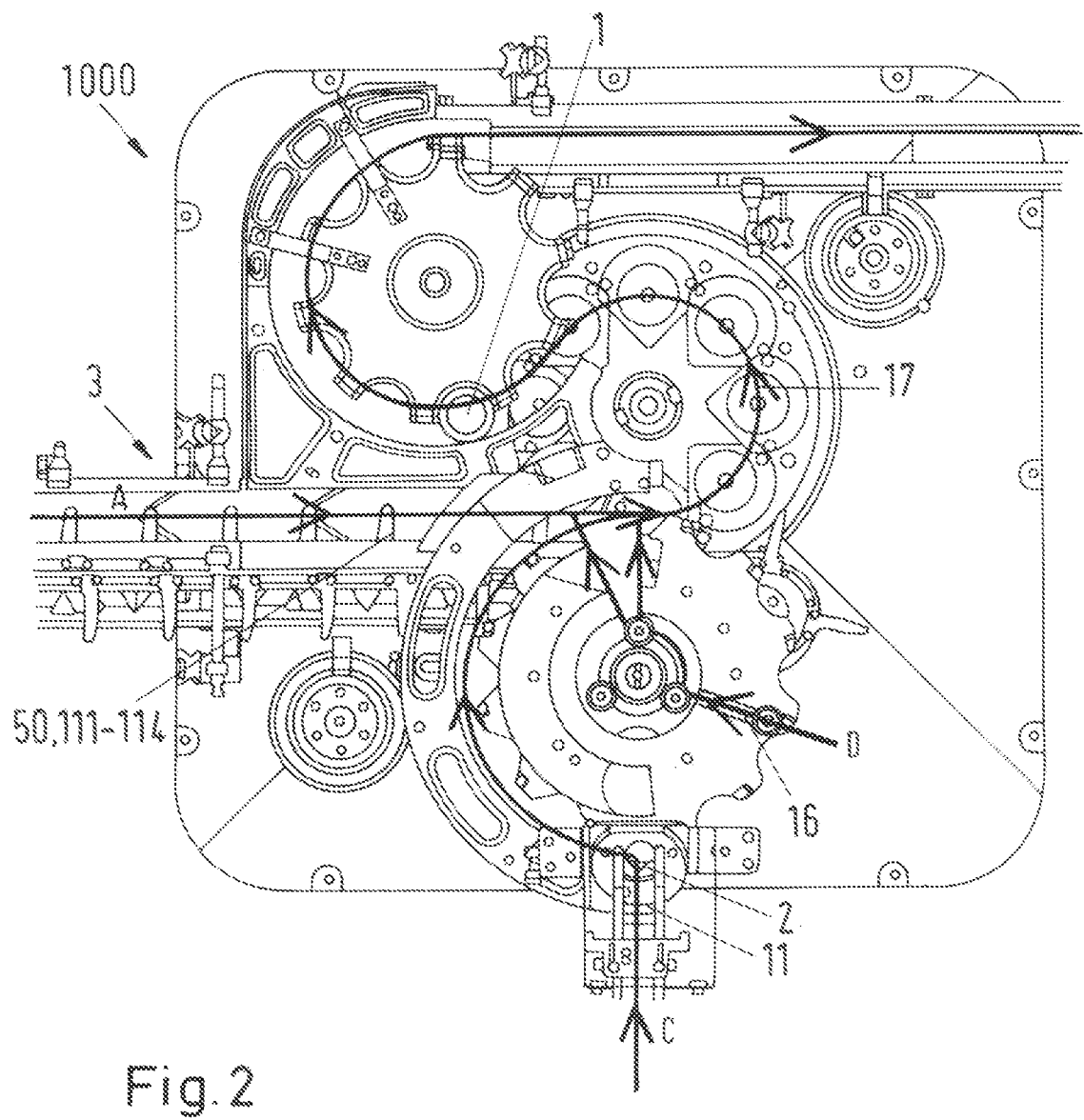
FIG. 2 illustrates a sealing module having a container feed system according to the disclosure.

FIG. 2 shows a sealing module in the form of a can sealer 1000 with a container feed system 3 according to the disclosure. When filling beverage cans or food cans, the cans 1 pass through a can sealer 1000 after being filled with the beverage or foodstuff, wherein the filled can bodies enter along the transport path via a feed path A by the container feed system 3 by being guided by carriers 50, 111-114. Can lids 2 enter via a further feed path C by the lid feeder 11.

The can sealer 1000 has several similar stations 17 arranged in a carousel shape, in each of which a can 1 is sealed with a can lid 2. The can lids 2 are guided onto the can 1, wherein the cans 1 are gassed along the arrow D by the gas supply 16. Subsequently, the can lids 2 are held on the can 1, wherein the holding serves to fix the cans 1 against breaking out of the circular path passed by the cans 1 in the can sealer 1000 due to the centrifugal force.

The cans 1 are seamed with the can lid 2 over a seaming roll at the edges and thus sealed in the can sealer 1000. Normally, the can 1 with the can lid 2 is additionally rotated around its own axis of symmetry by the seaming head.

Figure 3:
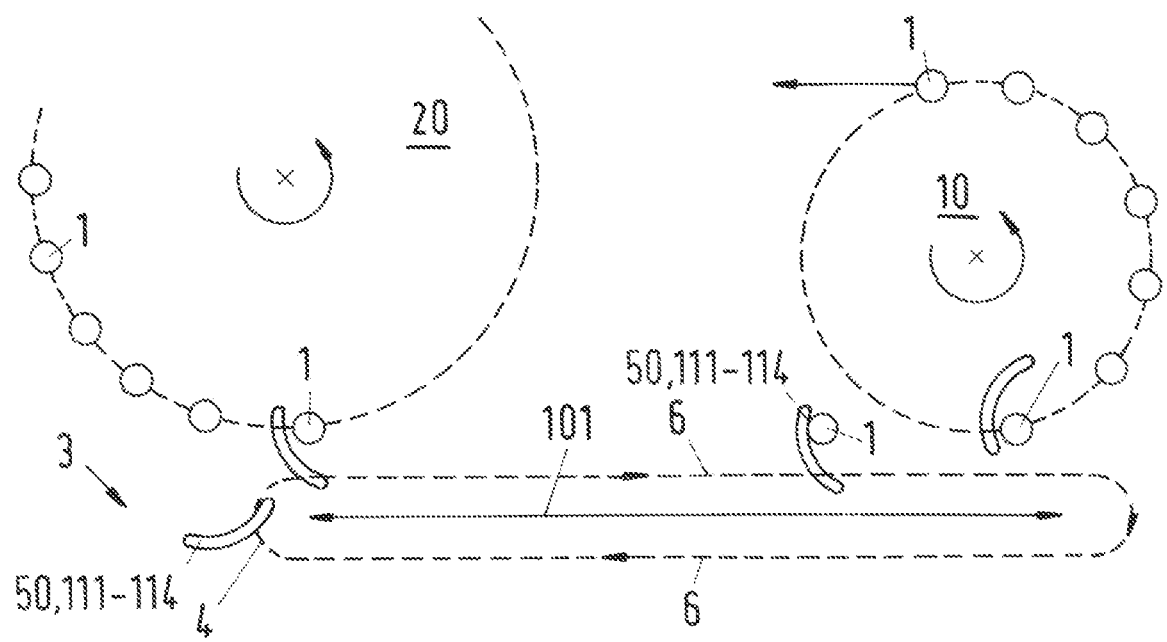
FIG. 3: illustrates a schematic view of a container feed system according to the disclosure between a container receiver and a container source.

FIG. 3 shows the schematic interaction of container source 20, transport path 101 and container receiver 10. The containers 1 are received in a receiving area by the carriers 50, 111-114, transported by the carriers 50, 111-114 along the transport path 101 to the transfer area where the containers 1 are received by the container receiver 10. In the embodiment according to FIG. 3, the pulling element is designed as a revolving pulling element. There are two guides 6, which extend in a straight section along the transport path 101.

Figure 4:
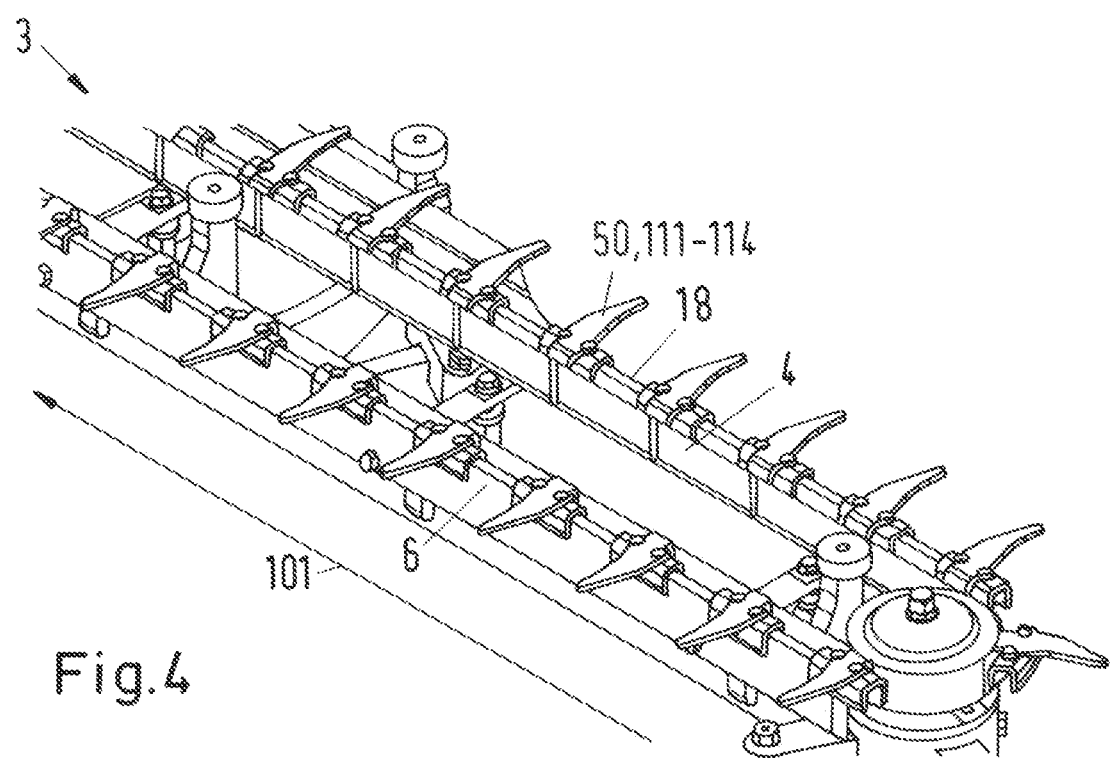
FIG. 4 illustrates a detail of a container feed system according to the disclosure.

FIG. 4 shows a detail of the container feed system 3 for the transport of the container along the transport path 101 from the container source to the container receiver. In particular, the container can be a can. The reception of the container from the container source and the transport to the container receiver is carried out by a first and second plurality of carriers 50, 111-114, which are designed as fingers and are shaped differently from each other. The carriers 50, 111-114 are connected to a pulling element in the form of a toothed flat belt 4 and are driven by it so that the carriers 50, 111-114 can be moved along the transport path 101, in addition, the guide 6 is arranged along the transport path 101, which guide serves to guide the carriers 50, 111-114 along the transport path 101. Here, the carriers 50, 111-114 are arranged on the guide 6 in such a way that they can be moved on a first surface 18 of the guide 6 in a sliding manner by the pulling element 4 and are guided along the transport path 101 in this way.

Figure 5:
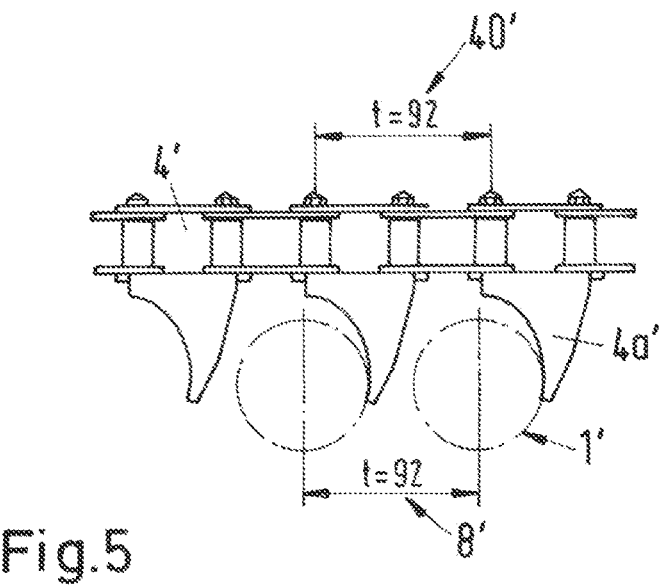
FIG. 5 illustrates a schematic view of a detail of a state-of-the-art pulling element having a specific spacing.
Figure 6:
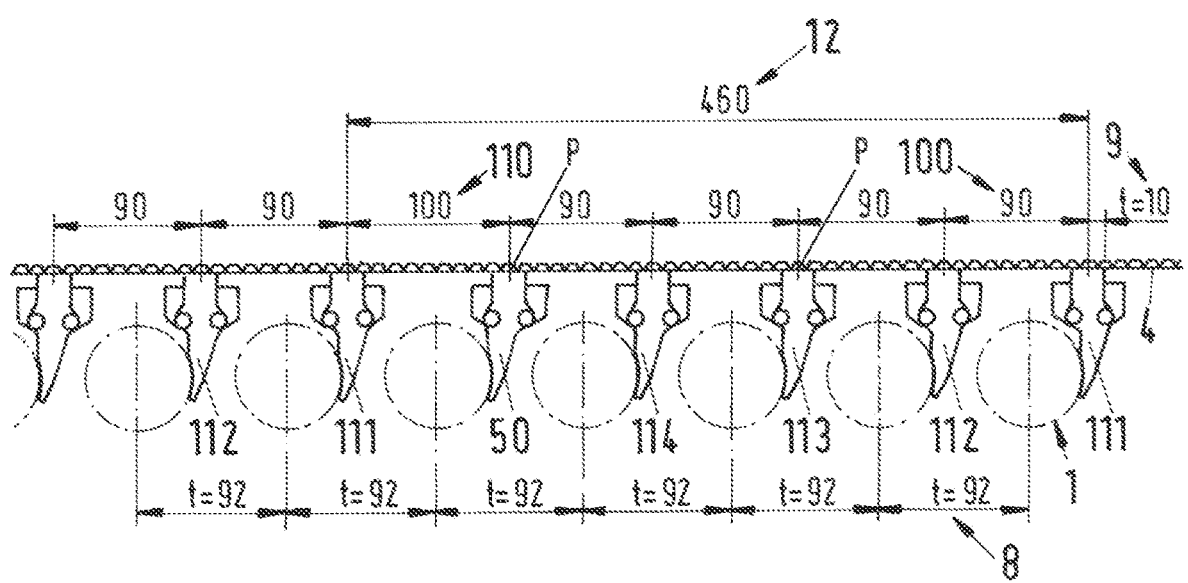
FIG. 6 illustrates a schematic view of carriers according to the disclosure on a toothed belt with unequal spacing.

In FIG. 5, a schematic detail of a chain 4' known from the state of the art with a common chain spacing 40' of 92 mm can be seen. A transport distance 8' between the containers 1' corresponds in each case to an n-fold of the chain spacing, in this case n=2 and requires two links to achieve the same spacing 40'. The container 1' is moved along the transport distance by the carriers 4a'. It can be seen from the schematic view that the carriers 4a' are all of the same shape, since the transport distance 8' is kept constant by the chain spacing 40' alone, FIG. 6 describes a schematic detail of an embodiment according to the disclosure with the arrangement of the different pluralities of carriers and the defined distances. Here, the carriers 111-114 represent the first plurality of carriers and the carriers 50 represent the second plurality of carriers. These pluralities of carriers are arranged on the toothed belt 4 at a fastening point P in each case and serve for the transport of the containers 1 along the transport path, each of which has a contact point with the carrier. To obtain a transport distance 8 of 92 mm, a toothed belt 4 with a tooth spacing 9 of 10 mm is constructed as follows:

In this embodiment, the positions for fastening the carriers are at a distance of 4 times 90 mm (first fastening distance 100) and 1 time 100 mm (second fastening distance 110) from each other. This results in a total distance of 460 mm per segment 12. These segments 12 repeat over the entire length of the toothed belt 4, which must be an n-fold of the segment length. In addition, the segment length 12 is a multiple of the transport distance 8.

Due to the different fastening distances, a different shape design of the individual pluralities of carriers 50, 111-114 and types of carriers 111414 is needed to ensure a transport distance 8 of 92 mm. In this case, a segment length 12 comprises five different fastening point carriers, four (types of) carriers of the first plurality of carriers 111-114 and one carrier of the second plurality of carriers 50. This number of carriers results from the quotient of the segment length 12 and the transport distance 8. Furthermore, the carriers of the first plurality of carriers 111-114 differ in shape and are different in shape from the carrier of the second plurality of carriers 50. The distance from the individual contact points to the containers 1 remains constant in each case. On the other hand, however, the distance between the contact point and the fastening point on the toothed belt 4 changes so that a transport distance 8 of 92 mm is ensured.

It is understood that the discussed specific embodiments of the disclosure are to be understood as merely exemplary and the disclosure is of course not limited to these alone. In particular, the person skilled in the art understands that the described embodiments can be combined in any suitable manner and also simple further developments obvious to the person skilled in the art are naturally covered by the claimed scope of protection.

The invention claimed is:

1. A container feed system for the transport of containers along a transport path, comprising:
    a pulling element configured to be moved along the transport path,
    a first plurality of carriers,
    a second plurality of carriers different from the first plurality, the first plurality of carriers and the second plurality of carriers are arranged distributed at fastening points of the pulling element in such a way that the containers are capable of being received and transported along the transport path by the first plurality of carriers and the second plurality of carriers during movement of the pulling element,
    the fastening points for first and second carriers of the first plurality of carrier are arranged side by side on the pulling element and have a first fastening distance and the fastening points of a third carrier of the first plurality of carriers is arranged next to a first carrier of the second plurality carriers on the pulling element and have a second fastening distance,
    each of the carriers of the second plurality of carriers have a shape that is different from a shape of each of the carriers of the first plurality of carriers such that a transport distance between the containers guided side by side along the transport path is constant irrespective of the first fastening distance and the second fastening distance.

2. The container feed system according to claim 1, wherein the first plurality of carriers has a plurality of different types of carriers, the different types of carriers have a shape differing from each other such that the transport distance between the containers guided side by side along the transport path is different from the first fastening distance.

3. The container feed system according to claim 2, wherein the shape of the different types of carriers differs by a distance of a contact point with the container to the fastening point along a moving direction of the pulling element.

4. The container feed system according to claim 1, wherein the first fastening distance is different from the second fastening distance.

5. The container feed system according to claim 1, wherein the shape of the first plurality of carriers is different from the shape of the second plurality of carriers by a distance of a contact point o with the container to the fastening point along a moving direction of the pulling element.

6. The container feed system according to claim 1, wherein the pulling element is a toothed belt.

7. The container feed system according to claim 1, wherein the first fastening distance is 85 mm 94 mm.

8. The container feed system according to claim 1, wherein the second fastening distance is 95 mm-105 mm.

9. The container feed system according to claim 1, wherein the transport distance is 80 mm-100 mm.

10. The container feed system according to claim 1, wherein the first carrier of the second plurality of carriers is arranged next to the second carrier of the first plurality of carriers and the first carrier of the first plurality of carriers is arranged next to a fourth carrier of the first plurality of carriers.

11. The container feed system according to claim 1, wherein each carrier of the first and second plurality of carriers are curved such that the container is stabilized during movement.

12. The container feed system according to claim 1, further comprising a guide arranged along the transport path to guide each carrier of the first and second plurality of carriers along the transport path, and the first and second plurality of carriers are arranged on the guide such that each of the first and second plurality of carriers is capable of being in a sliding manner along a first surface of the guide by the pulling element.

13. The container feed system according to claim 12, wherein each of the first and second plurality of carriers comprises a sliding element having at least a first sliding surface, and the sliding surface is arranged on the first surface such that each of the first and second plurality of carriers is capable of being moved via the sliding element in a sliding manner along the first surface of the guide.

14. A processing device for processing a container, comprising:
    a container source;
    a container receiver; and
    a container feed system according to claim 1, is the container feed system arranged between the container source and the container receiver to transport the container from the container source to the container receiver.

15. A method for the transport of containers, comprising:
    providing a container feed system according to claim 1;
    receiving the container by the carrier in a receiving area from the container source;
    transporting the container by the carrier along the transport path, and
    delivering the container to the container receiver in a transfer area.

16. The container feed system according to claim 1, wherein the first fastening distance is 1 mm to 10 mm smaller than the second fastening distance.

17. The container feed system according to claim 1, wherein the first fastening distance is 89 mm-91 mm.

18. The container feed system according to claim 1, wherein the second fastening distance is 98 mm-101 mm.

* * * * *